United States Patent [19]

Lis

[11] Patent Number: 4,814,656
[45] Date of Patent: Mar. 21, 1989

[54] INTERCONNECTION APPARATUS FOR A SEGMENTED AMORTISSEUR WINDING

[75] Inventor: Robert J. Lis, Willowbrook, Ill.

[73] Assignee: General Motors Corporation, Detroit, Mich.

[21] Appl. No.: 132,584

[22] Filed: Dec. 14, 1987

[51] Int. Cl.$^4$ .......................... H02K 3/51; H02K 19/14
[52] U.S. Cl. ..................................... 310/269; 310/211; 310/42; 310/71
[58] Field of Search .................. 310/42, 71, 125, 211, 310/261, 269

[56] References Cited

U.S. PATENT DOCUMENTS

| 4,358,698 | 11/1982 | Peterson et al. | 310/187 |
| 4,453,101 | 6/1984 | Nelson | 310/211 |
| 4,490,638 | 12/1984 | Lind | 310/269 |
| 4,517,471 | 5/1985 | Sachs | 310/160 |

FOREIGN PATENT DOCUMENTS 754576  11/1978  U.S.S.R. .

Primary Examiner—Patrick R. Salce
Assistant Examiner—D. L. Rebsch
Attorney, Agent, or Firm—Mark A. Navarre

[57] ABSTRACT

An amortisseur bar interconnection arrangement for a synchronous dynamoelectric machine rotor in which amortisseur bars embedded in the various rotor poles are interconnected by a pair of segmented conductive strips disposed about the circumference of the rotor hub. The amortisseur bars for each pole are supported by a pair of conductive rotor pole end laminations. When the rotor poles are attached to the rotor hub, the end laminations each physically engage a segmented conductive strip disposed in an annular recess formed on the circumference of the rotor hub, thereby completing the electrical connection between the various amortisseur bars. The segmented conductive strips are backed by a compressible resilient pad which maintains sufficient engagement force between the end laminations and the conductive strip to ensure a solid electrical connection therebetween.

5 Claims, 2 Drawing Sheets

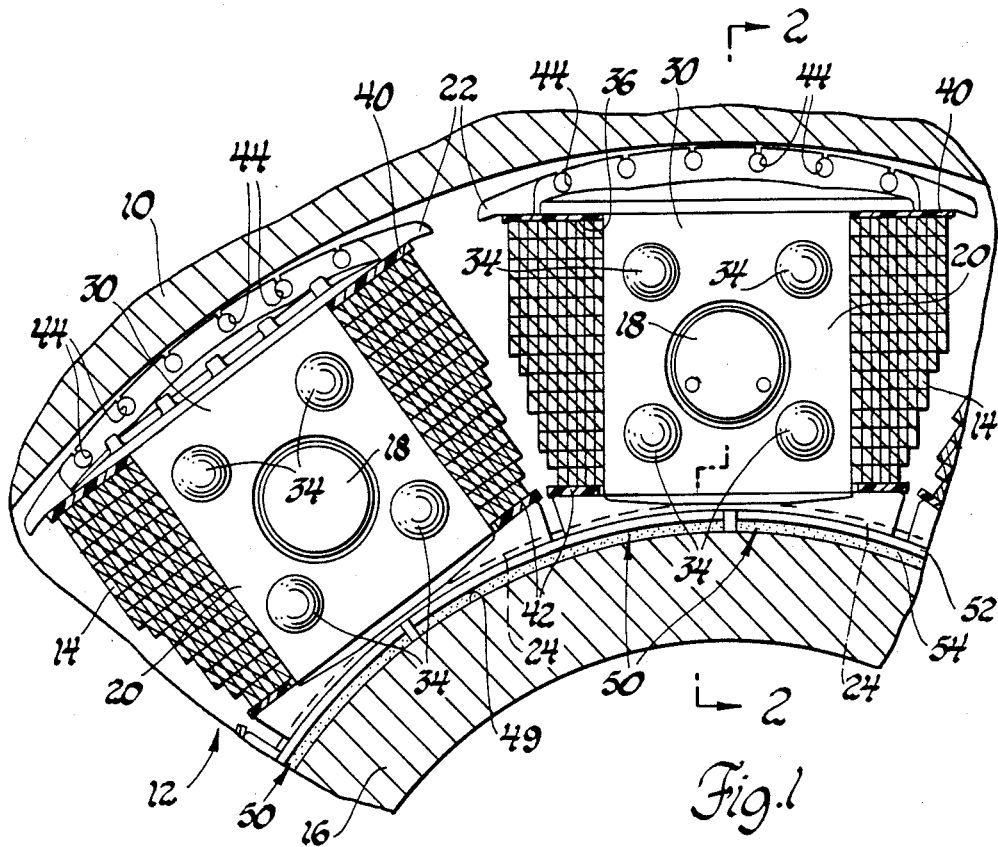
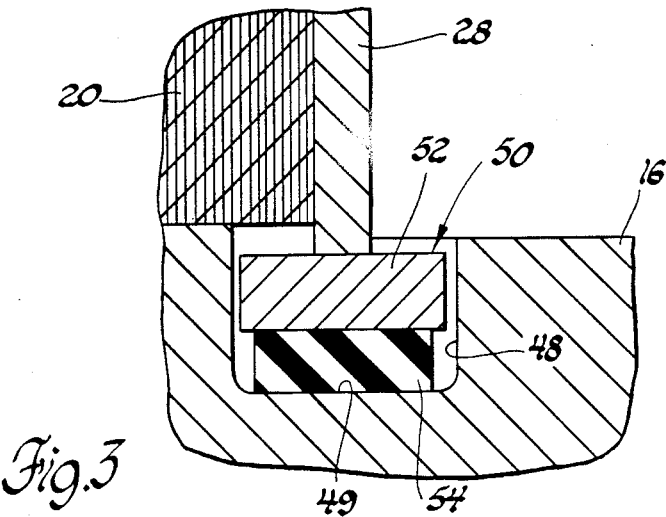

INTERCONNECTION APPARATUS FOR A SEGMENTED AMORTISSEUR WINDING

This invention relates to amortisseur windings for the rotor of a dynamoelectric machine, and more particularly to a method and apparatus for interconnecting amortisseur windings.

BACKGROUND OF THE INVENTION

In many synchronous dynamoelectric motor applications, amortisseur or rotor pole face bar windings are customarily employed for augmenting the motor starting torque. The amortisseur windings of the various rotor poles are shorted together so that the synchronous motor essentially acts like an induction motor whenever the rotor speed deviates from its synchronous speed, such as during the initial start-up and acceleration to synchronous speed. When the synchronous speed is reached, the relative slip between the rotor and stator fields becomes negligible, and little or no current is conducted by the amortisseur windings.

In conventional practice, the amortisseur bar windings for each pole are brazed or welded to a shorting ring associated with that pole. Shorting rings associated with adjacent rotor poles are then electrically and mechanically interconnected by a conductive strap brazed or bolted thereto.

SUMMARY OF THE PRESENT INVENTION

The present invention invention is directed to an improved amortisseur bar arrangement in which the amortisseur bars embedded in the various rotor poles are interconnected by a pair of segmented conductive strips disposed about the circumference of the rotor hub. The amortisseur bars for each pole are supported by a pair of conductive rotor pole end laminations. When the rotor poles are attached to the rotor hub, the end laminations physically engage one or the other of a pair of segmented conductive strips disposed in annular recesses formed on the circumference of the rotor hub, thereby completing the electrical connection between the various amortisseur bars. The segmented conductive strips are backed by a compressible resilient pad which maintains sufficient engagement force between the end laminations and the conductive strip to ensure a solid electrical connection therebetween.

In practice, the compressible pad itself has an adhesive backing which keeps the segmented strip in place prior to attachment of the rotor poles. The electrical connection between the pole end laminations and the segmented rings is automatically made upon attachment of the respective rotor pole assemblies, eliminating the interconnect assembly steps required with known amortisseur arrangements. Maintenance which requires removal of the rotor poles is also simplified since the amortisseur bar interconnection is automatically broken upon removal of the rotor pole from the rotor hub.

BRIEF DESCRIPTION OF THE DRAWINGS

FIG. 1 is a partially sectioned end view of a synchronous machine rotor in accordance with this invention.

FIG. 3 is an expanded view of the cross section area designated by the numeral 3 in FIG. 2.

DETAILED DESCRIPTION OF THE DRAWINGS

Figure 2:
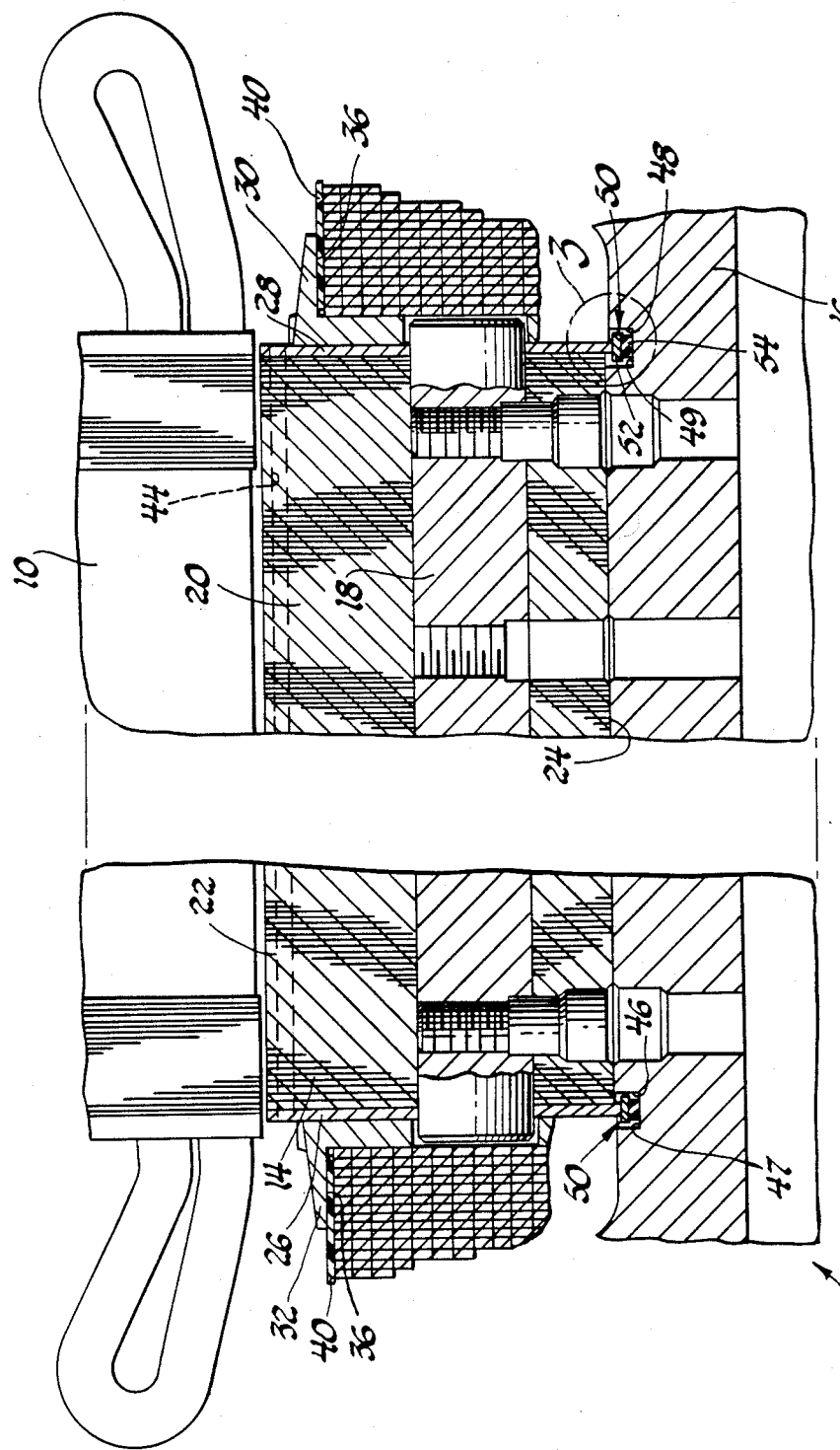
FIG. 2 is a cross section view of the rotor of FIG. 1 taken along the lines 2—2.

Referring to FIG. 1, there is shown a portion of a synchronous dynamoelectric machine comprising a stator 10 and a rotor generally designated by the reference numeral 12. The rotor 12 comprises a plurality of salient poles 14 secured to a cylindrical rotor hub 16 for rotation therewith about its longitudinal axis.

As best seen in the cross section of FIG. 2, each rotor pole 14 comprises a solid cylindrical core piece 18 and a laminated core piece 20. The laminated core piece 20 is disposed about the solid core piece 18 and the assembly is adapted to be bolted to the rotor hub 16 as shown. The laminated core piece 20 has a tapered outboard pole surface 22 which faces the stator 10 to define the working air gap of the machine and a circular inboard surface 24 adapted to engage the hub 16.

The laminated core piece 20 is flanked at its longitudinal end faces by a pair of relatively thick copper end laminations 26, 28. The end laminations 26, 28 have the same general shape as the intermediate laminations but extend radially inward to a greater extent to define a portion of the amortisseur winding interconnection arrangement of this invention as explained below.

In each rotor pole 14, a pair of upper and lower coil support elements 30, 32 are secured to opposite ends of the laminated core piece 20 by threaded fasteners 34 passing through suitable lamina openings. The elements 30, 32 serve to retain the lamina of the core piece 20 and to form a recess 36 in which the coil turns 38 are wound. Insulation between the recess 36 and the coil turns 38 is provided by strip insulation and a pair of insulated washers 40, 42.

The end laminations 26, 28 and each of the intermediate laminations of the pole piece 20 have a number of longitudinally extending openings 44 formed just inboard of the pole surfaces 22 thereof. A copper alloy amortisseur bar is placed in each such opening and welded to the end laminations 26, 28 to define amortisseur windings for each rotor pole 14.

The rotor hub 16 is provided with a pair of annular recesses 46, 48 formed on its outboard circumference in longitudinal alignment with the rotor pole end laminations 26, 28. Within each recess 46, 48, and extending substantially from pole center to pole center, are a number of segments 50. Each such segment 50 comprises an arcuate conductive element 52 of copper or copper alloy and a strip 54 of high durometer rubber bonded thereto with a suitable adhesive. To facilitate manufacture, the rubber strips 54 are also bonded to the circumferential surfaces 47, 49 of the respective recesses 46, 48. A slight gap is maintained between juxtaposed segments 50 so that there is no significant engagement between circumferentially adjacent segments when the rotor poles 14 are attached to the hub 16. This prevents buckling of the conductive segments 52 upon such attachment.

When a rotor pole piece 18 is in position for attachment to the rotor hub 16, the end laminations 26, 28 are centered over and extend into the hub recesses 46, 48. As the pole piece 18 is drawn tight against the rotor hub 16, the end laminations 26, 28 engage the juxtaposed copper segments 52 and compress the rubber strips 54 thereunder. This forms an electrical connection between the end laminations 26, 28 and the juxtaposed copper segments 52 in engagement therewith, which engagement is maintained by the resilient force of the compressed rubber strips 54. The conductive segments 52 and the mating curved surfaces of the end laminations 26, 28 may be tin plated, if desired, to improve the contact resistance of the connection. An enlarged view of an end lamination 28 in engagement with a conductive segment 52 is shown in FIG. 3.

When the rotor poles 14 are all bolted to the rotor hub 16, the amortisseur bars in openings 44 are electrically interconnected through a path comprising the end laminations 26, 28 and the copper segments 53. Such connection is made automatically as the rotor poles 14 are attached to the rotor hub 16 in the normal course of the machine assembly, thereby eliminating the costly and complicated procedure of separately provided amortisseur winding interconnections. The only extra steps involve the initial attachment of the segments 50 to the rotor hub 16, which steps may be performed offline, prior to final assembly. When maintenance or repair requires removal of a rotor pole, the amortisseur winding interconnections are automatically interrupted and remade upon reattachment of the rotor pole.

While this invention has been described in reference to the illustrated embodiment, various modifications will occur to those skilled in the art, and it will be understood that arrangements incorporating such modifications may fall within the scope of the present invention, which is defined by the appended claims.

The embodiments of the invention in which an exclusive property or privilege is claimed are defined as follows:

1. A rotor for a synchronous dynamoelectric machine, comprising:
    hub means including a cylindrical hub, and a pair of segmented conductive strips disposed within a pair of annular recesses formed in the outer circumference of said hub; and
    pole means including a plurality of wound laminated rotor pole pieces adapted to be attached to the outer circumference of said hub, a plurality of amortisseur bars embedded in each said pole piece adjacent an outer radial face thereof, each pole piece having electrically conductive end laminations which electrically join the respective ends of said amortisseur bars and which extend radially inward from the intermediate laminations to engage said conductive strips upon attachment of said pole piece to said hub, thereby to form a closed electrical circuit between the amortisseur bars of the various rotor pole pieces through said conductive strips and respective end laminations.

2. The rotor set forth in claim 1, further comprising:
    resilient means disposed in each of said recesses between the respective conductive strip and a circumferential surface of the respective recess, such resilient means being compressed upon attachment of said pole pieces to said hub and thereafter forcing said conductive strips into engagement with said pole piece end laminations to maintain the electrical connection therebetween.

3. The rotor set forth in claim 2, wherein prior to the attachment of said rotor pole pieces to said hub, the conductive strips are bonded to said resilient means, and the resilient means is bonded to the respective circumferential surfaces of said recesses.

4. The rotor set forth in claim 2, wherein said resilient means and each of said conductive strips are divided into a plurality of segments evenly spaced about the circumference of said respective recesses so that when said resilient means is compressed upon attachment of said pole pieces to said hub, there is no significant engagement between circumferentially adjacent segments of said conductive strips, thereby to prevent buckling of said conductive strips.

5. The rotor set forth in claim 4, wherein the number of segments in each conductive strip is equal to the number of rotor pole pieces to be attached to said hub, and wherein such segments span substantially from the point of attachment of a respective pole piece to the point of attachment of a pole piece which is circumferentially adjacent thereto.

* * * * *